Figure 3:
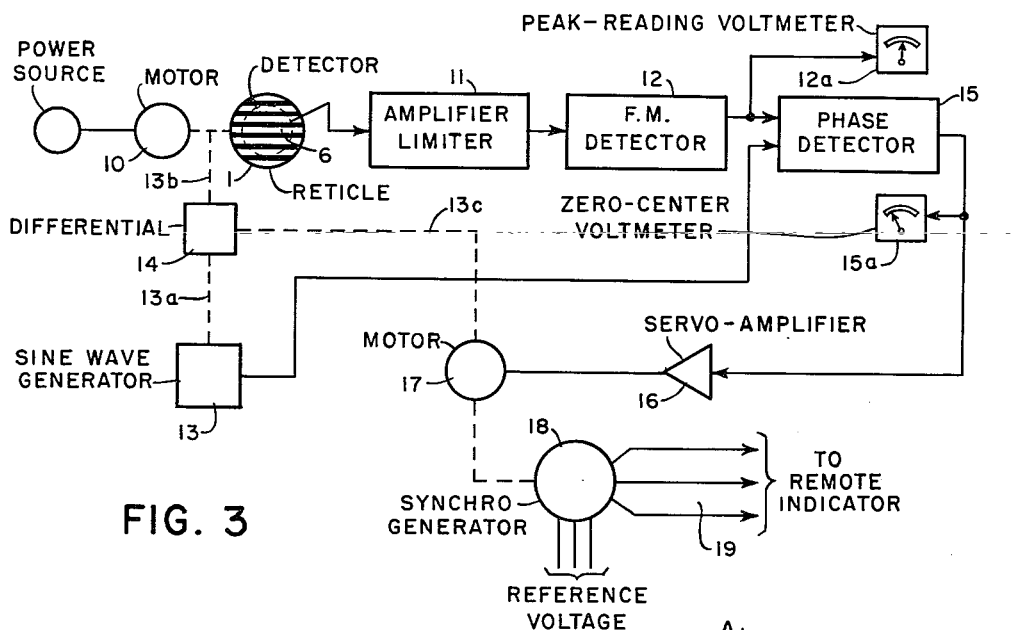

3,006,233
OPTICAL NAVIGATIONAL INSTRUMENTS
Melvin S. Stiles, Rochester, and Robert N. Straehl, Pittsford, N.Y., assignors to General Dynamics Corporation, Rochester, N.Y., a corporation of Delaware
Filed Dec. 16, 1957, Ser. No. 703,182
6 Claims. (Cl. 88—1)

This invention relates to navigational instruments for aircraft or surface craft and is particularly directed to means for continuously and accurately determining the altitude, velocity, and drift. By drift is meant the angular direction of travel of the aircraft or surface craft with respect to its heading.

When the terrain is visible over which an airplane is traveling, the relative lateral velocity, or drift, is directly obtainable by various optical aids. For example, an optical grating can be placed in the line of sight to the ground and rotated to move the conventional parallel hairlines of the grating parallel to the apparent direction of travel of objects on the ground. When the terrain is not visible however, drift must be indirectly computed from such radio navigational aids as may be in operation. To reliably plot a course and drift angle from two or more position fixes via radio contact with the ground requires considerable equipment, the undivided attention of a skilled navigator and, worse, long delays. Heretofore continuous passive indication of drift angle has been virtually impossible, except in the case of the optical drift angle above mentioned.

The object of this invention is to provide an improved driftmeter.

A more specific object of this invention is to provide a driftmeter that yields instantaneous and continuous drift angle information.

The objects of this invention are obtained by means for "viewing" the terrain, over which the craft is moving, with any photoelectric type of detector that is responsive to radiations from the terrain. Such a detector may assume the form of vacuum or gas-filled phototubes or cells, or photoconductive solid state devices. The radiations may be infrared or visible light of the kind normally emanating from ground or water surfaces. The normal radiation may be supplemented, if desired, by a source of energy on the craft for illuminating the terrain viewed by the detector. A grating with parallel spaced bars opaque to the ground radiation is placed in the light path. The light detector output will be chopped or amplitude modulated, at a rate corresponding to the rate at which prominent objects on the ground move across the field of view of the detector and across the bars of the grating. Further, the chopping rate is a function of the angle at which the objects move across the bars. Means for rotating said grating is provided so that the opaque bars cyclically shift through positions parallel with and perpendicular to the actual direction of travel of the craft. The cyclic shift is evidenced, in the preferred embodiment of the invention, by a frequency discriminating circuit which produces a sinusoidal voltage related in phase to the parallel-perpendicular position mentioned. The driftmeter of this invention is finally characterized by means for determining the phase position of the rotating grating with respect to the lubber line of the craft. The fixed phase of a second fixed frequency sinusoidal wave is locally generated. The phase relation of the two sinusoids is compared to yield a voltage representative of drift angle.

Figure 2:
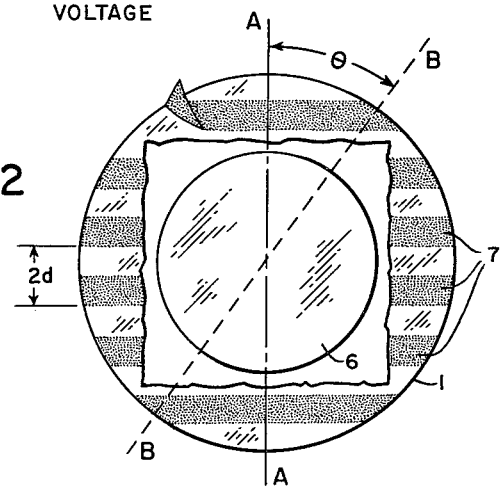
Figure 1:
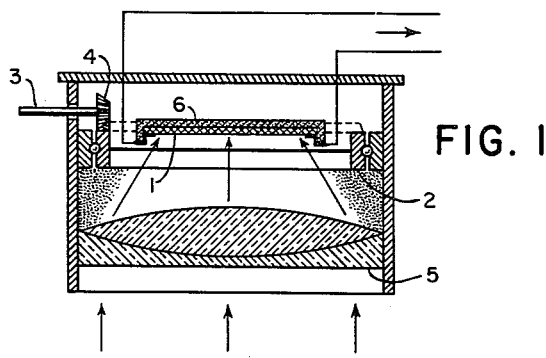

Other objects and features of this invention will become apparent to those skilled in the art by referring to the specific embodiments described in the following specification and shown in the accompanying drawing, in which:

FIG. 1 is a sectional view of one detector of the driftmeter of this invention;
FIG. 2 is a plan view of the reticle of FIG. 1; and,
FIG. 3 is a block diagram of the circuitry of one driftmeter of this invention.

One reticle, shown at 1 in FIGURES 1 and 2, comprises a transparent circular disc mounted along its periphery in the inner race 2 of a bearing so that the reticle will rotate in its own plane when driven, for example, by the shaft 3 and pinion 4 meshing with teeth on the inner race. An optical system such as lens 5 with suitable light shields gathers light from the ground and directs the light upon the cell 6. The cell per se is not claimed and may comprise any detector such as a light sensitive photoconductor or photoelectric cell adapted to respond with changes in resistance or current to changes in visible or invisible light rays from the ground. A lead sulfide cell, for example, has good response to infrared rays. A conventional bolometer may be used, if desired.

The reticle shown in plan view in FIGURE 2 comprises the disc-shaped transparent window with parallel opaque bars 7 painted, or printed, or otherwise impressed upon the face of the window. When the radiation characteristics of the terrain are such that prominent objects will continuously enter the field of view of the photodetector, and when the detector size and reticle resolution are such that prominent targets or objects, such as roads, houses, trees, et cetera, are smaller than or comparable in size to the reticle line spacing, the detector will generate voltage containing a complex frequency components of which are a function of altitude and velocity, and can be made to automatically compute drift angle. The size of the detector and focal length of the optics will determine the sensitivity of the detector and the field of view.

FIGURE 2 shows best the geometry involved in deriving drift according to the system of this invention. Line A—A represents the lubber line of the aircraft or an imaginary line parallel to the longitudinal axis of the aircraft and may be scribed on the reticle at right angles to the reticle stripes. Line B—B is the line of apparent motion of visible targets on the ground when cross-wind causes drift. It can be seen that as the targets move through the field of view, chopping of the target radiation will occur. Furthermore, it can be seen that the chopping rate will depend on the angle between the lubber line and the line of motion of the target. The frequency or chopping rate will also depend on the velocity, $V_o$, of the aircraft, and on altitude, $h$, above ground inasmuch as the light gathered to the detector is not collimated. Thus, the chopping frequency, $$f = \frac{KV_o \cos \theta}{2h\theta}$$

where $V_o$ is ground speed of the aircraft, $h$ is altitude of aircraft above terrain, $2\theta$ is angular resolution in radians of a reticle pair (of wide $d$, FIG. 2), $\theta$ is angle between lubber line and the line of motion of the target, and K is a constant to rationalize dimensions of parameters to yield frequency.

It can now be seen that if the reticle is rotated so that $\theta = 90°$ then the chopping frequency $f = 0$, whereas if $\theta = 0°$ the chopping frequency is a maximum. Further, it can be seen that altitude, $h$, or velocity $V_o$, or the ratio $V_o/h$, are functions of frequency, $f$, and can be quantitatively derived from the output voltage of the photodetector.

If the reticle is continuously rotated at a constant angular velocity, "W," then any ground targets which pass through the field of view of the detector will cause a frequency modulated signal to be developed by the photoconductive detector whose deviation or frequency excursion is determined by the velocity-height ratio, $V_o/h$, and whose modulating frequency is determined by the angular velocity of the rotating reticle. This signal may then be amplified and applied to a frequency discriminator where a sine wave will be recovered whose frequency is equal to the angular frequency, W, of the rotating reticle but whose phase will vary as a known function of the angle $\theta$ with respect to a reference sine wave of the same frequency. This reference voltage could be generated in a number of ways, one of which is hereinafter described.

FIGURE 3 is one implementation of the principles of this invention. The motor 10 drives the reticle at a constant speed. Through appropriate gearing, such as the gearing of FIG. 1, the circular reticle is caused to turn in the optical path of the photoconductive detector causing target images to be chopped at a frequency whose instantaneous value varies sinusoidally as the reticle stripes rotate. As mentioned above, the maximum chopping frequency occurs when the reticle stripes are perpendicular to the aircraft motion over the ground. Measurement of the phase of the sinusoidal wave relative to an aircraft-based reference wave will provide a direct measure of drift angle. Signals from the detector 6 are amplified at 11, and preferably are limited in amplitude to provide usable input levels under all expected conditions of signal strength, to the frequency detector 12. Many frequency detectors are known which have the property of providing an output voltage varying directly in amplitude with input frequency. For example, FM detectors may be employed of the type shown on pages 586 or 587 of "Radio Engineers' Handbook," by Terman, McGraw-Hill, 1943. Thus, with constant reticle speed a voltage varying sinusoidally with reticle angle is provided at the output terminal of detector 12 and at a phase relative to the reticle reference, A—A, which is a measure of drift angle. The position of a shaft driving the reticle can serve as a reference, and for this purpose the sine potentiometer 13, excited with a regulated direct current voltage, is chosen. Potentiometers are commercially obtainable which are so wound with resistance wire that terminal voltage is a sinusoidal function of shaft position. The speed ratio of the reticle and potentiometer is 1 to 1.

The phase angle $\theta$ now present between the locally generated reference sine wave and the reticle-generated sine wave may be indicated directly by applying the two waves to an indicating instrument such as a cathode-ray oscilloscope (not shown). Alternatively, the two waves may be compared in a phase detector, shown at 15, and the phase difference indicated on the zero-center voltmeter 15a. Alternatively, one phase may be shifted until the two waves precisely coincide, whereupon a voltage null is indicated.

Conveniently, as shown in FIGURE 3, the differential 14 is mechanically adjusted to null one wave upon the other. In the mechanical linkage 13 is placed a mechanical differential 14 for altering the relative phase position of the potentiometer shaft 13a to that of the reticle shaft 13b. It becomes clear now that the angular change introduced through the differential to cause the reference sine wave to coincide in phase with the output of the frequency detector will be a measure of the unknown phase and will be equal to the aircraft drift angle $\theta$. The input shaft 13c to the differential is adjusted by motor 17 in the specific example shown. To servo the drift angle shaft to the desired null position, both sinusoids are compared in the phase detector 15 to obtain an output direct current, the polarity of which indicates the sense of phase displacement, and the amplitude of which indicates the amount of phase displacement. This output or error voltage is amplified in servo amplifier 16 and applied to motor 17 which in turn drives the differential in either direction to null the phase displacement of the two sine waves. For remote indicators, the shaft of motor 17 may be coupled to the rotor of the synchro generator or transmitter 18, energized with a reference or line voltage, to produce at the three output terminals 19 information concerning the rotational position of the motor shaft 13c.

The magnitude of the sine wave obtained from the frequency modulation detector 12 will vary, depending on the particular altitude and ground speed of the aircraft. Since the reference sine wave from 13 is of fixed amplitude, although of a frequency identical to the reticle frequency, unequal inputs will in general be fed to the phase detector 15. This will cause the error signals obtained to vary in amplitude but not in sign, therefore causing only changes in the sensitivity of the servo system while leaving unaffected the position accuracy. For uniform performance, nonlinear amplification can be used in the amplifier 11 to limit the range of variation over all conditions of operation.

Minor variations in the frequencies of the two sine waves will result from power supply frequency excursions affecting the speed of drive motor 10 if the motor is of the synchronous variety, or from other factors affecting the speed of a motor. These are of no concern since both the reticle and reference generator 13 are made subject to the same fluctuations in speed. There are no frequency sensitive elements involved, with responses in the region of expected speed change rates. The modulating frequency resulting from rotation of the reticle is low compared with the average chopping frequency, while the time constants of the frequency modulation detector 12 is short compared with the period of the reticle rotation. Thus the envelope formed by the cycle rate counter is a faithful representation of the modulation function over the range of modulating frequencies.

Referring again to the expression, supra, equating chopping frequency factors, it is seen that the ratio of velocity to altitude, $V_0/h$, is proportional to chopping frequency, $f$, and that for a given $\theta$, $\phi$, and $K$, the ratio information is contained in the output of the F.M. detector 12. The peak-reading voltmeter 12a is coupled to the output of the detector according to a further feature of this invention and is calibrated to read in terms of $V_0$, for a given $h$; or $h$ for a given $V_0$; or $V_0/h$. In case either factor $V_0$ or $h$ is desired directly, the other must, of course, be obtained from other instruments on the craft. The time constant of the meter would of course be adjusted long enough to integrate the sine wave and show only the peak values of the wave.

With an understanding of the operation of the specific example above described, many modifications will occur to those skilled in the art. For example, the specific reticle for chopping the ground signal to the photo-conductive detector may assume many configurations. The only requirement is that the chopping frequency become a function of the angle between the lubber line and the actual direction of travel.

What is claimed is:

1. In combination in a driftmeter for aircraft of the class described, a photoelectric light detector for generating a complex wave corresponding to random reflecting relatively moving objects on the ground, a grating, said grating being rotatably disposed with respect to the light detector so as to chop the light to the detector, a motor for continuously driving said grating to frequency modulate said complex wave at the chopping frequency, a limiting amplifier coupled to the output of said detector for holding said complex wave at a substantially constant amplitude, a frequency-modulation detector coupled to the output of said amplifier for detecting the frequency modulating component; a sine-wave generator driven by a linkage coupled to said motor, a differential mechanism in said linkage to vary the phase relation of the sine wave generator and said rotatable grating; a phase detector for comparing the phase of the output of said frequency-modulation detector and the output of said sine-wave generator, and a servo feedback connection coupled between said phase detector and said differential for automatically adjusting said phase relation to a predetermined value, and means for indicating the feedback error quantity to quantitatively show said phase relation.

2. In combination in a driftmeter navigating instrument, a photocell, an optical system for directing radiant energy from moving terrain beneath an airplane upon said photocell to produce a complex voltage wave representative of the reflecting irregular surfaces of said terrain, a grating of spaced parallel opaque bars continuously rotating in said optical system for chopping said energy and frequency modulating said complex wave, an amplifier-limiter coupled to said photocell for amplifying to a substantially constant level said complex wave, a frequency modulation detector connected to said amplifier-limiter and responsive to the frequency components of the photocell detected energy for producing a wave having the chopping frequency and having a phase which shifts as the drift angle of said aircraft changes, a reference wave source of fixed frequency corresponding to the chopping frequency and of fixed phase and a phase detector coupled to said frequency modulation detector and said reference wave source for measuring and indicating the shifting phase.

3. In a driftmeter for airplanes comprising a grating and a photocell, said grating being disposed in a light path between the photocell and ground, said grating being continuously driven at a predetermined speed, an amplifier-limiter connected to said photocell for amplifying detected energy to a substantially constant amplitude, a frequency discriminator connected to said amplifier-limiter for detecting the chopped frequency components of said radiant energy, a wave generator for generating a wave of fixed phase and frequency equal to said chopped frequency component, and a phase detector for comparing the phase of said chopped frequency component with said fixed phase and for generating a voltage representative of phase differences, and indicating means calibrated in terms of drift angle responsive to said phase detector.

4. A driftmeter of the class described comprising a grating of parallel-spaced bars opaque to radiant energy, a photoelectric device responsive to said radiant energy, and an optical system for gathering radiant energy from the terrain over which the meter is moved to produce a complex voltage wave at the output of said photoelectric device, said grating, photoelectric device and optical system being arranged to direct said energy to said photoelectric device through said grating; said grating being continuously rotatable in a plane normal to said directed energy to bring the opaque bars alternately into mutually perpendicular positions, and means for continuously driving the rotating grating at a substantially constant speed to frequency modulate said complex wave with a sine wave equal in frequency to the period of rotation of said grating, an amplifier-limiter means for amplifying the signal to a substantially constant amplitude, a frequency modulation detector coupled to said amplifier for producing a direct current undulating at the frequency of said sine wave, a source of reference wave of fixed-frequency and fixed-phase, and means for determining the phase of said undulating wave with respect to said fixed-frequency fixed-phase reference wave.

5. A driftmeter for a craft travelling over irregular terrain, means on the craft for receiving and detecting random radiant energy from the terrain, a grating of parallel-spaced bars, the bars being alternately transparent and opaque to said energy; means for continuously rotating said grating in front of said means for detecting energy to bring said bars alternately into parallel and perpendicular relation with the direction of travel of the craft over said terrain for frequency modulating the random detected energy, an amplifier-limiter connected to the radiant energy detecting means for bringing all detected signals to substantially constant amplitude, a frequency modulation detector coupled to the output of said amplifier for producing a sine wave, analogous to the speed of rotation of said grating, whose phase varies as the drift angle of said craft varies, and a phase detector for measuring the variation of said phase from a norm.

6. In combination in a driftmeter, a pickup device for random radiant energy from the relatively moving underlying terrain, a reticle comprising parallel-spaced bars opaque to said energy, said reticle being rotatably mounted to frequency modulate the random signals received by said pickup device, a motor for continuously driving said reticle, a wave generator synchronized with the rotation of said reticle, an amplifier-limiter coupled to said pickup device, a frequency modulation detector coupled to said amplifier-limiter, said frequency modulation detector being of the type whose output voltage contains the frequency modulation component of said random signals, and a phase detector having two inputs coupled, respectively, to the output of said wave generator and to the output of said frequency modulation detector for comparing the phase of the wave of said generator with said frequency modulation component of like frequency, and means for shifting the phase of one input to said detector with respect to the other input.

References Cited in the file of this patent
UNITED STATES PATENTS 2,425,541 Konet _____ Aug. 12, 1947
2,942,119 King et al. _____ June 21, 1960

UNITED STATES PATENT OFFICE
CERTIFICATION OF CORRECTION

Patent No. 3,006,233                          October 31, 1961

Melvin S. Stiles et al.

It is hereby certified that error appears in the above numbered patent requiring correction and that the said Letters Patent should read as corrected below.

Column 2, lines 51 to 53, the equation should appear as shown below instead of as in the patent:

$$f = \frac{KV_o \cos \theta}{2h\phi}$$

line 55, for "2θ" read -- $2\phi$ --.

Signed and sealed this 17th day of April 1962.

(SEAL)
Attest:

ESTON G. JOHNSON
Attesting Officer

DAVID L. LADD
Commissioner of Patents